United States Patent [19]

Muller

[11] Patent Number: 4,501,235
[45] Date of Patent: Feb. 26, 1985

[54] TUNED ENGINE INTAKE MANIFOLD

[75] Inventor: George H. Muller, Ann Arbor, Mich.

[73] Assignee: Ford Motor Company, Dearborn, Mich.

[21] Appl. No.: 482,098

[22] Filed: Apr. 4, 1983

[51] Int. Cl.³ .............................................. F02M 35/10
[52] U.S. Cl. .................................................. 123/52 M
[58] Field of Search ......... 123/52 M, 52 MB, 52 MV, 123/59 R

[56] References Cited

U.S. PATENT DOCUMENTS

| | | | |
|---|---|---|---|
| 1,942,226 | 1/1934 | Timian | 123/52 M |
| 2,305,946 | 12/1942 | Wilson et al. | 123/52 M |
| 2,845,911 | 8/1958 | Gill | 123/52 MV |
| 2,845,912 | 8/1958 | Bird | 123/52 M |
| 2,927,564 | 3/1960 | Turlay et al. | 123/52 MV |
| 2,947,294 | 8/1960 | Bird et al. | 123/52 MV |
| 2,980,087 | 4/1961 | Ball | 123/52 MV |
| 3,024,774 | 3/1962 | Eby | 123/52 M |
| 3,026,861 | 3/1962 | Brown | 123/52 MV |
| 3,516,247 | 6/1970 | Knox | 60/32 |
| 3,730,160 | 5/1973 | Hughes | 123/52 M |
| 3,945,357 | 3/1976 | Ableitner | 123/52 M |
| 3,994,270 | 11/1976 | Nakano et al. | 123/52 M |
| 4,341,186 | 7/1982 | Mayr et al. | 123/52 M |
| 4,409,934 | 10/1983 | Kaindl | 123/52 M |

FOREIGN PATENT DOCUMENTS 1132643  3/1957  France .............................. 123/52 M Primary Examiner—Craig R. Feinberg
Assistant Examiner—David A. Okonsky
Attorney, Agent, or Firm—Robert E. McCollum; Clifford L. Sadler

[57] ABSTRACT

An automotive type engine is provided with an intake manifold having tuned runners all of the same length and each extended to a substantial length sufficient to tune the runner, and each of which are coiled unidirectionally approximately 270° from the plenum essentially around and beneath the same for connection to the engine cylinder head mounting flange, the runners each tapering or flaring in a decreasing manner for approximately the last half of their length closest to the engine cylinder head to maintain a constant fuel velocity and thereby decrease the tendency of wall wetting resulting from a normal slowing down of the fuel as it progresses along an extended length runner, the runners and plenum being heated to lessen fuel condensation, the runners being provided with large and progressive coil radii to minimize centrifugal force deposition of fuel on the walls, and the entire intake manifold fitting beneath the engine air cleaner essentially within the same area as a conventional intake manifold having short runners.

11 Claims, 9 Drawing Figures

TUNED ENGINE INTAKE MANIFOLD

This invention relates in general to an automotive type internal combustion engine with a tuned intake manifold featuring related long runners. More particularly, it relates to one that is not only tuned but also packaged to fit within essentially the same space as a conventional short runner manifold. It also is readily adaptable as a retrofit to other engines, whether they be of the carbureted or fuel injection type.

Tuning an intake manifold by synchronizing the induction pressure pulsations to provide optimum carburetion without fuel spit-back is known. For example, given certain engine parameters as the bore and stroke, the effective length of each of the intake manifold runners to obtain the highest volumetric efficiency and output from the engine over a wide speed range can be calculated from equations given in SAE Paper No. 700122, January 1970, Yogi et al.

Some of the problems entailed with a tuned manifold construction, however, have been the extreme length of each runner resulting in bulkiness of the assembly, a limited range of operation in a tuned mode, and condensation of fuel on the walls of the runners due either to flow direction reversal, abrupt changes in direction of the flow, narrow or small radius bends resulting in centrifuging of the fuel against the walls, or to cooling of the fuel over the length of the runners. The extra length, 85 cm., compared to 20 cm. for a conventional length untuned runner, for example, makes it difficult to use straight runners in an automotive vehicle, as they would extend beyond the normal confines of the vehicle.

This invention provides a construction that minimizes the above disadvantages by providing tuned manifold runners of extended lengths but curled unidirectionally from one side of a plenum approximately 270° toward and past the opposite side to each individual cylinder head intake port, with large radius bends and a nesting arrangement of the runners, which are heated by the engine exhaust gases, engine coolant, or other suitable means.

The prior art discloses specific tuned engine manifold constructions. Some relate to exhaust systems to assure that the pressure wave resonance is compatible with the intake charge wave, and vice versa. For example, U.S. Pat. No. 3,516,247, Knox, Jr., shows a tuned exhaust manifold having four runners extending through multiple planes to a common distributor, to conserve space. However, two of the runners reverse the flow direction with narrow bend radii, which would not be at all satisfactory for an intake manifold flowing fuel at high velocity.

U.S. Pat. No. 2,845,911, Gill, describes an induction system having a plenum from which tuned runners extend unidirectionally 180° to the various inlet ports. However, the runners are arranged in a vertical plane and connected to separate banks of cylinders, and would not be satisfactory to be contained within presentday low height vehicle lines.

U.S. Pat. No. 2,305,946, Wilson et al, describes and shows tuned intake manifold runners having lengths that can be varied so that the pressure waves of different runners reinforce one another to provide a ram effect to the mixture charge to the cylinders.

U.S. Pat. No. 2,947,294, Bird et al, U.S. Pat. No. 2,980,087, Ball, U.S. Pat. No. 2,845,912, Bird, Jr., U.S. Pat. No. 3,024,774, Eby, Jr., U.S. Pat. No. 2,927,564, Turlay et al, U.S. Pat. No. 4,341,186, Mayr et al, and U.S. Pat. No. 3,945,357, Albleitner, are other examples of tuned intake manifolds with longer than conventional intake runners or logs. These, however, extend noticeably beyond the normal engine assembly, and, therefore, would not at all be satisfactory with present-day designs of low hood, narrow and reduced height engine compartments, or for transverse engine installations for front wheel drive vehicles as opposed to conventional longitudinally disposed engine installations.

The invention provides a compact tuned intake manifold that has extended length runners that coil unidirectionally in essentially a horizontal plane for approximately 270° with gradual bends of large radii, and nest in a manner to be contained beneath and within the confines of the engine air cleaner envelope so as not to extend the overall width, height, or depth of the engine assembly.

It is a primary object of the invention, therefore, to provide an engine intake manifold with equal length runners that are much longer than conventional and extended to a length sufficient to tune the runner, and the runners being coiled and nested with the other runners in a unique manner to provide a compact construction that fits essentially within the same area beneath the engine air cleaner as would a conventional untuned intake manifold.

A further object of the invention is to provide tuned runners that taper inwardly as the runners approach the respective cylinder head intake ports, to increase the velocity of the fuel to provide a ram induction effect.

A still further object of the invention is to provide an intake manifold with tuned runners each of which gradually curves in essentially a horizontal plane approximately 270° from a central air or air/fuel distribution plenum toward and past the opposite side of the plenum for connection to the engine intake ports, the pairs of runners from opposite sides of the plenum crossing one another without sharp or abrupt bends, and all runners being of the same length.

Other objects, features and advantages of the invention will become more apparent upon reference to the succeeding detailed description thereof, and to the drawings illustrating the preferred embodiments thereof; wherein, FIGS. 1 and 1A are side elevational views of opposite sides of an automotive type engine embodying the invention;

Figure 1:
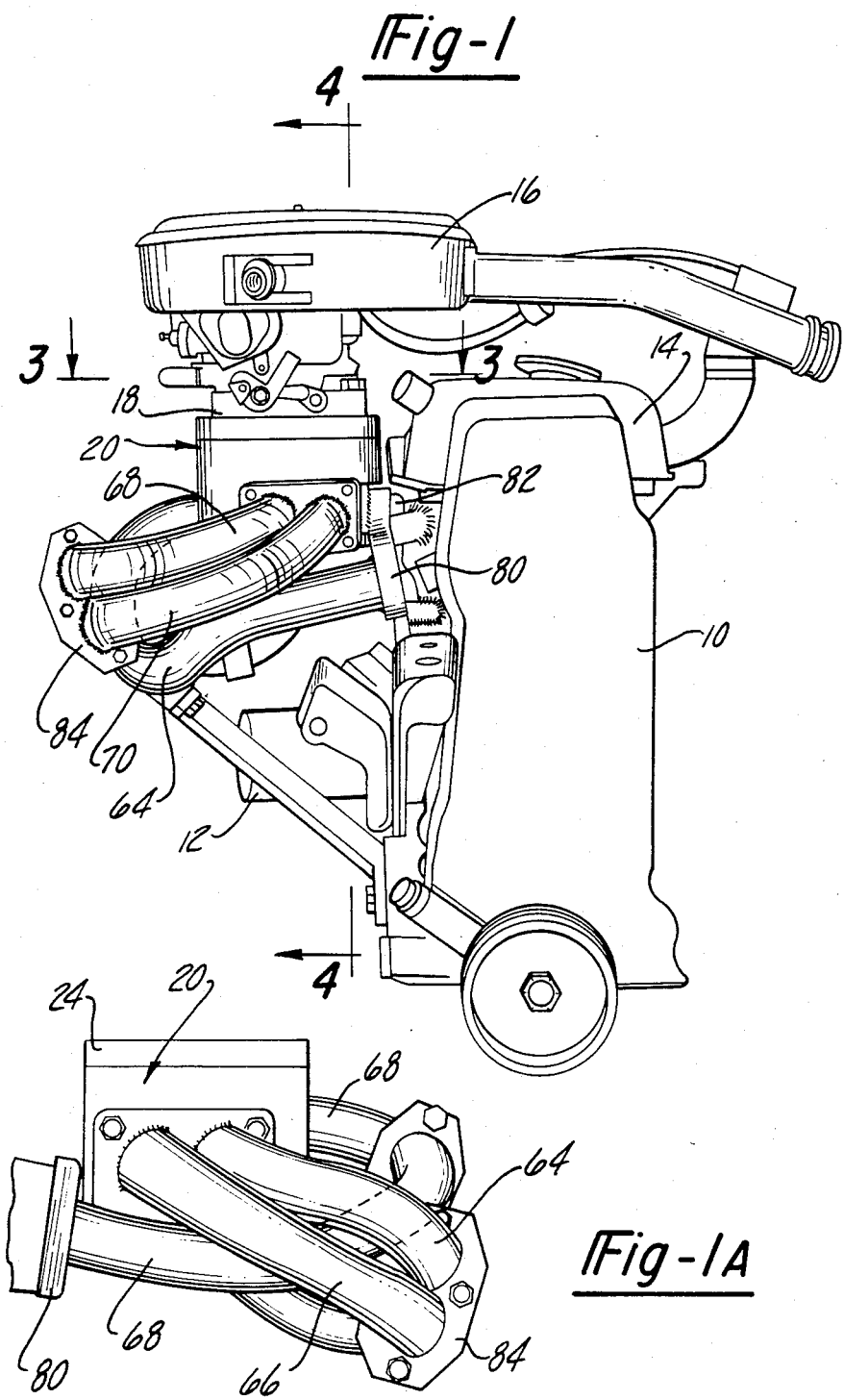

FIG. 1 shows a four cylinder in-line type of automotive internal combustion engine 10 having a conventional oil filter 12 and valve cover 14. An air cleaner assembly 16 provides a supply of clean air to a downdraft type carburetor illustrated schematically at 18, which is located directly over and attached to a plenum 20 forming a part of the intake manifold assembly.

As seen more clearly in FIGS. 3-6, the plenum 20 is a fabricated unit consisting essentially of a hat-shaped rectangular box having an annular flange 22 at its top for engagement with a dish shaped cover plate 24. The cover plate has a pair of central apertures 26 that mate with the throttle riser bores 28 extending from carburetor 18 through openings in a spacer 32 and a flexible combination support flange and seal 34.

Figure 5:
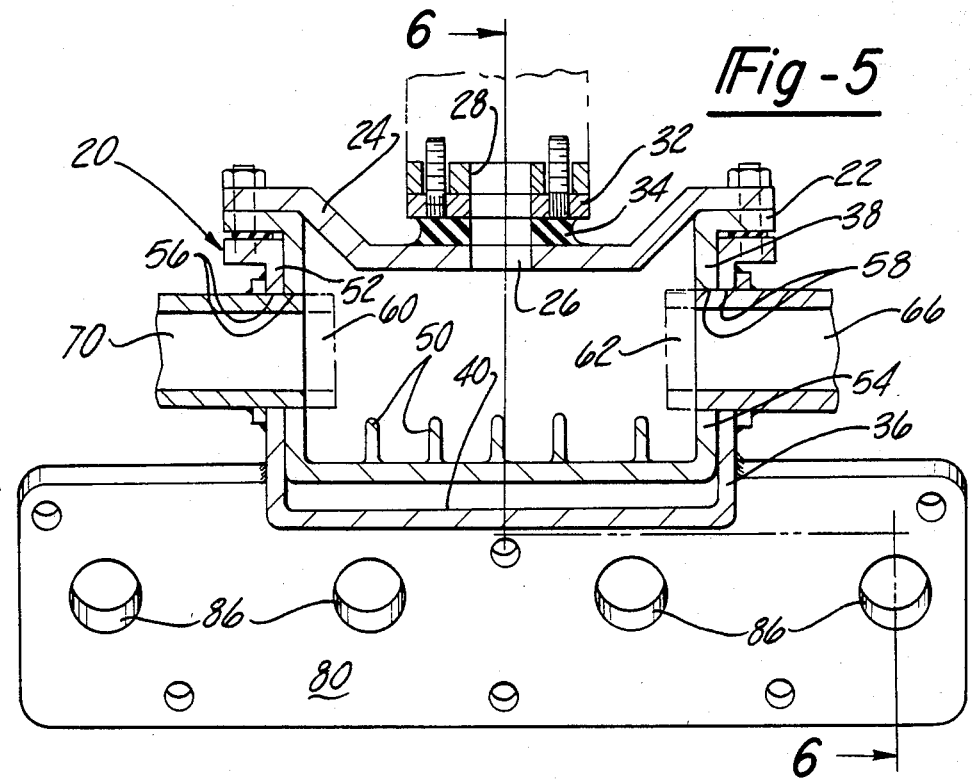
FIG. 5 is an enlarged cross-sectional view taken on a plane indicated by and viewed in the direction of the arrows V—V of FIG. 4.
Figure 6:
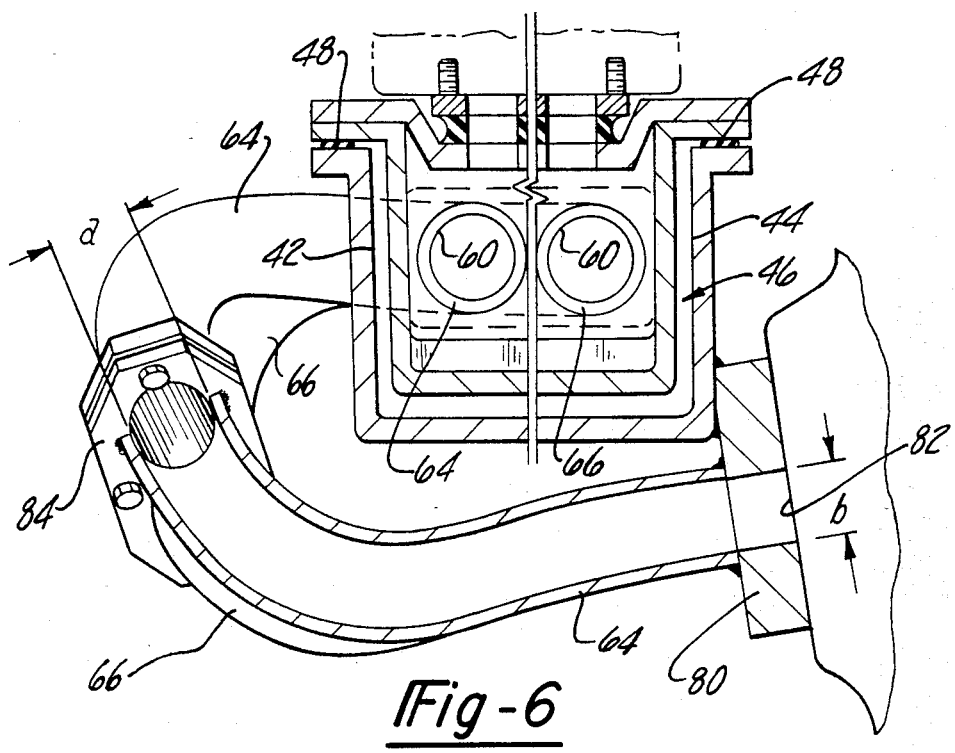
FIG. 6 is a cross-sectional view taken on a plane indicated by and viewed in the direction of the arrows VI—VI of FIG. 5; and, FIG. 7 is an exploded perspective view of another embodiment of the invention.

Plenum 20 is essentially a box within a box as shown more clearly in FIGS. 5 and 6, with heating media in-between. It contains a base housing 36 within which is mounted a subhousing 38. The latter is spaced from housing 36 at the bottom wall 40 and the two opposite side walls 42 and 44 to provide a heating channel or chamber 46 between. The channel in this case contains hot engine coolant supplied to the channel in any suitable manner, not shown. It will be clear that the channel could contain other suitable heating media, such as engine exhaust gases, for example. Annular seal 48 prevents the leakage of coolant outwardly from the chamber. FIG. 5 shows a plurality of ribs 50 projecting from the bottom of subhousing 38 for an efficient transfer of heat from chamber 46 to the air/fuel mixture charge flowing into plenum 20 from the carburetor.

Figure 2:
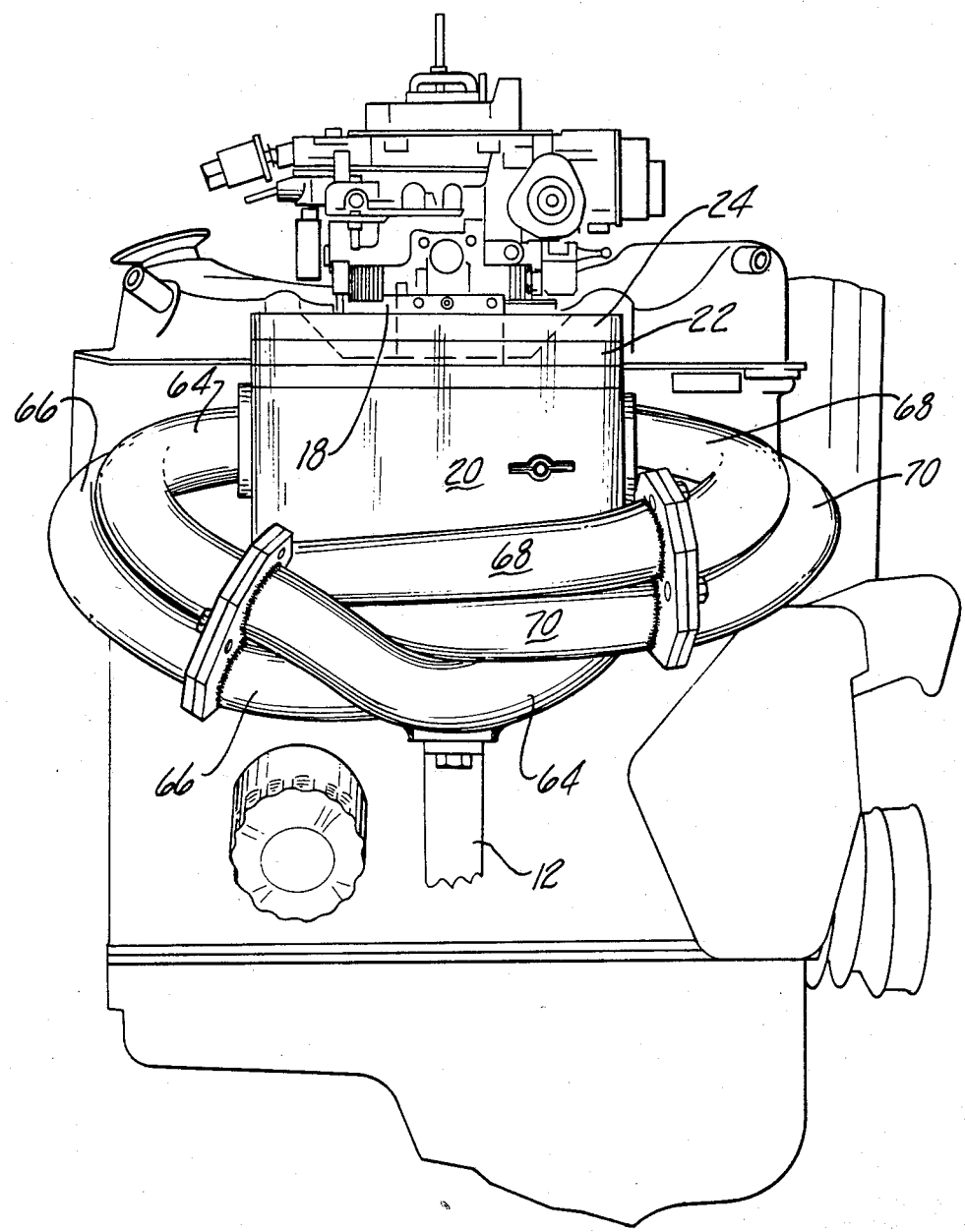
FIG. 2 is a rear elevational view of the engine of FIG. 1.
Figure 3:
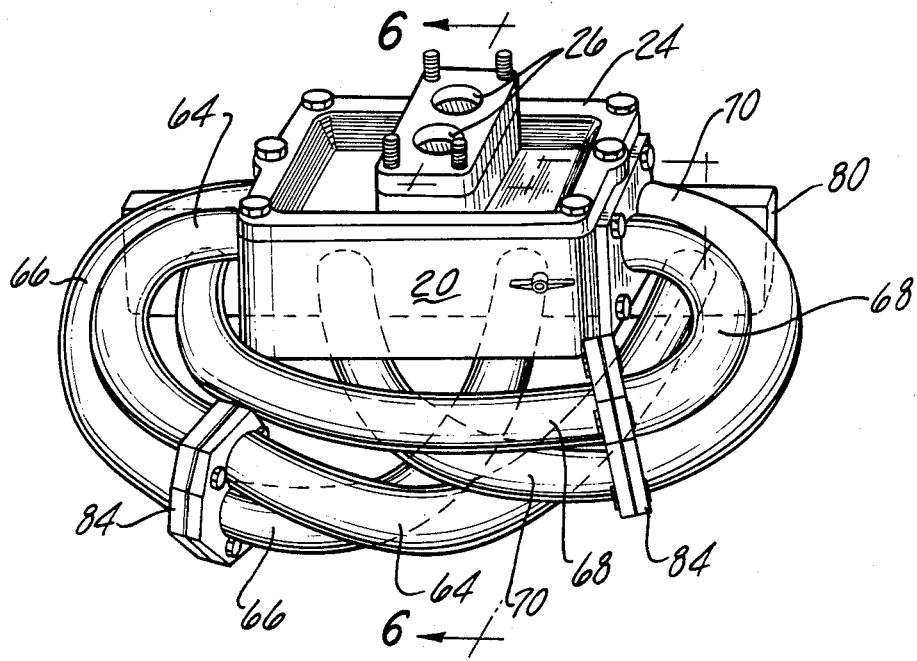
FIGS. 3 and 4 are plan views taken on planes indicated by and viewed in the direction of the arrows III—III and IV—IV, respectively, of FIG. 1.
Figure 4:
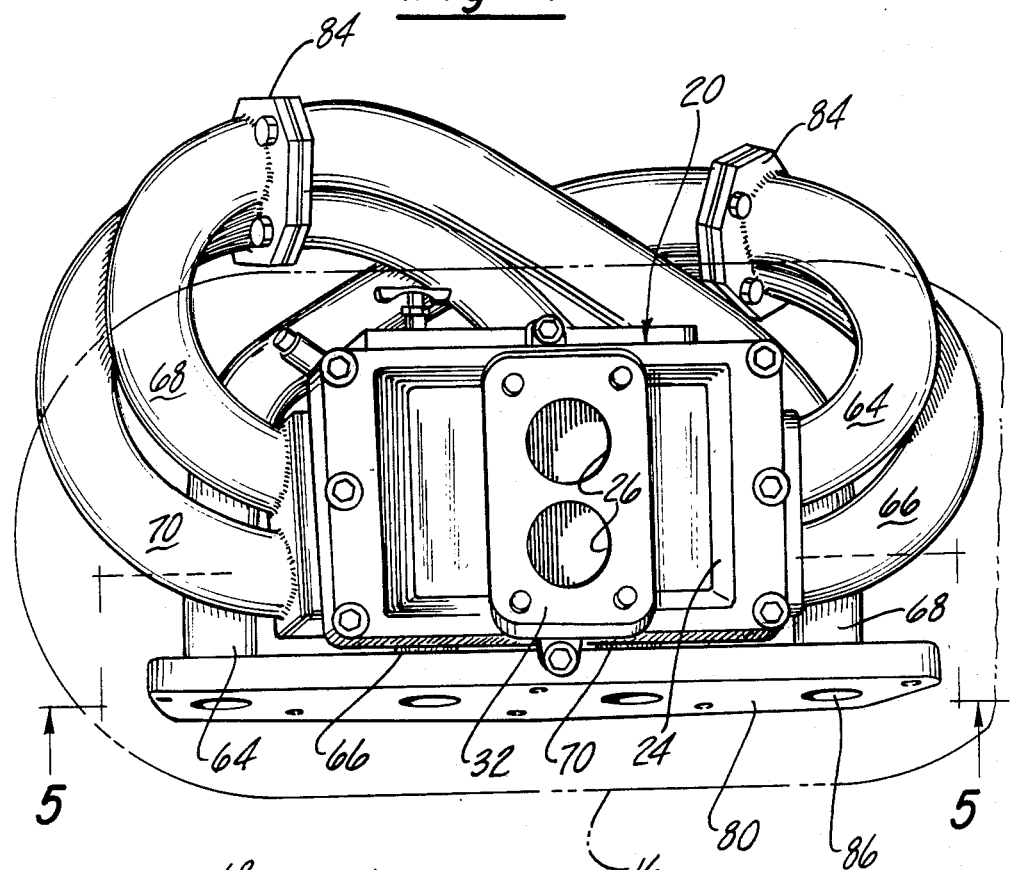

The contiguous side walls 52 and 54 of housing 36 and subhousing 38 each are provided with aligned outlet apertures 56 and 58 for receiving the inlet ends 60 and 62 of the four manifold runners 64, 66, 68 and 70 shown more clearly in FIGS. 2-4. The latter would be welded as shown to plenum housing 36.

As stated previously, in order for the manifold to be tuned to synchronize the intake pressure pulsations to achieve optimum carburetion, first, the runners must all be essentially the same length. Second, each of the runners must be of a specific extended length, which in the case of a given engine cylinder bore of—"and a stroke of—", with given valve opening size and timing is calculated to be approximately 88 cm., or about 33.5". However, in order to package the over two and one-half foot long runners within essentially the same area beneath the air cleaner assembly as a conventional four cylinder in-line engine intake manifold with 18 to 20 cm. long runners, it is necessary to coil the runners. And, if all of the cylinders are to receive essentially an equal volume of air/fuel charge, this coiling must be accomplished so as not to cause a loss in fuel flow velocity in any runner relative to the rest, or condensation of the fuel on the walls of any of the runners or one runner relative to the others. The runners, therefore, are gradually coiled back upon themselves and wrapped around each other in a manner to avoid sharp bends and any reversal of direction of flow that would otherwise deposit liquid fuel on the walls, and, further, are heated to avoid a cooling and condensation of the fuel. In first approximation, coiling may be obtained through the use of circular sections tangent to straight cylindrical runner segments. However, it is preferable to use the more gradual cubics rather than circular sections (i.e., quadratics), the straight tubular elements with a radius of curvature of infinity then being tangent to the cubic sections at their point of inflection where the radius of curvature is also infinity and varies continuously from that point on to a minimum before increasing again as required by the runner's configuration.

More specifically, referring to FIGS. 1-4, it will be seen that the runners each curve or coil gradually and unidirectionally from one side of plenum 20 in essentially a horizontal plane for approximately 270° to extend essentially around and/or beneath the opposite sides of the plenum for connection at right angles to a mounting flange 80. The latter is secured by bolts to a mating flange 82 on the cylinder head of the engine. The runners 64 and 66 curve from one side, while the two oppositely directed runners 68 and 70 similarly curve approximately 270° around the plenum for connection beneath the same to mounting flange 80. It will be appreciated, as best seen in FIGS. 2-4, that the pairs of runners cross one another in a nesting manner to occupy as little space as possible. The unidirectional coiling of each of the runners in the manner shown and described thus enables the compact packaging of the total intake manifold in a small area essentially within the lateral confines of the air cleaner assembly indicated in phantom lines in FIG. 4.

It also should be noted that the gradual bending of the runners results from the use of large bend radii so that any centrifugal force developed as a result of curving the path of the fast moving air/fuel mixture charge will be minimized to essentially avoid deposition of fuel on the walls of each runner. Also, the gradual coiling avoids abrupt changes in direction of flow to minimize shock losses and discontinuity of flow. Furthermore, it should be noted that each of the runners flares inwardly or tapers in a decreasing manner, as indicated by the difference in diameter "a" from that of a diameter "b" in FIG. 6 over approximately the last half of the length of runner 66, for example, from connecting flange 84 to the cylindrical head inlet port. This maintains the original velocity level of the air/fuel mixture charge and thereby compensates for a natural slowing down of the flow over the long length of the runner. This also reduces condensation of the fuel and equalizes flow to each of the engine cylinders. It further provides a ram effect to the incoming charge. The flow normally would tend to decelerate in a constant diameter runner due to frictional resistance as it nears the end of the run adjacent the inlet port, which would promote wall wetting and condensation.

Figure 4A:
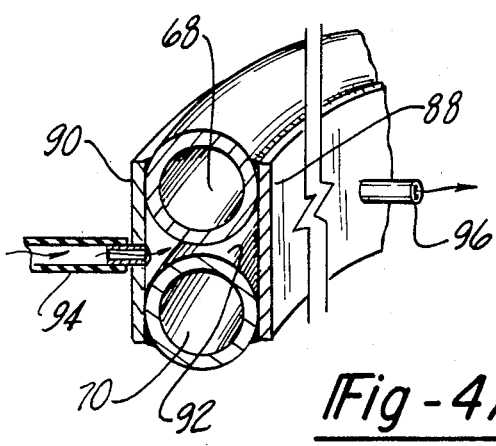
FIG. 4A is a cross-sectional view of a modification.

FIG. 4A illustrates a modified version of the runners to further minimize cooling of the fuel and resultant condensation. In this case, adjacent runners, 70 and 68, for example, could be enclosed by suitable plates 88 and 90 to provide a heating chamber 92 between for warming of the fuel as it passes along the runners. A hot water or coolant inlet 94 from the engine cooling system would admit heated liquid to chamber 92 with an outlet 96 provided at a remote location along wall 88 for return to the cooling system. Other methods of heating plenum 20 or the runners may also be provided, such as, for example, as stated previously, using the heat of the engine exhaust gases from the conventional exhaust manifold crossover passage (not shown) in place of the water.

Figure 7:
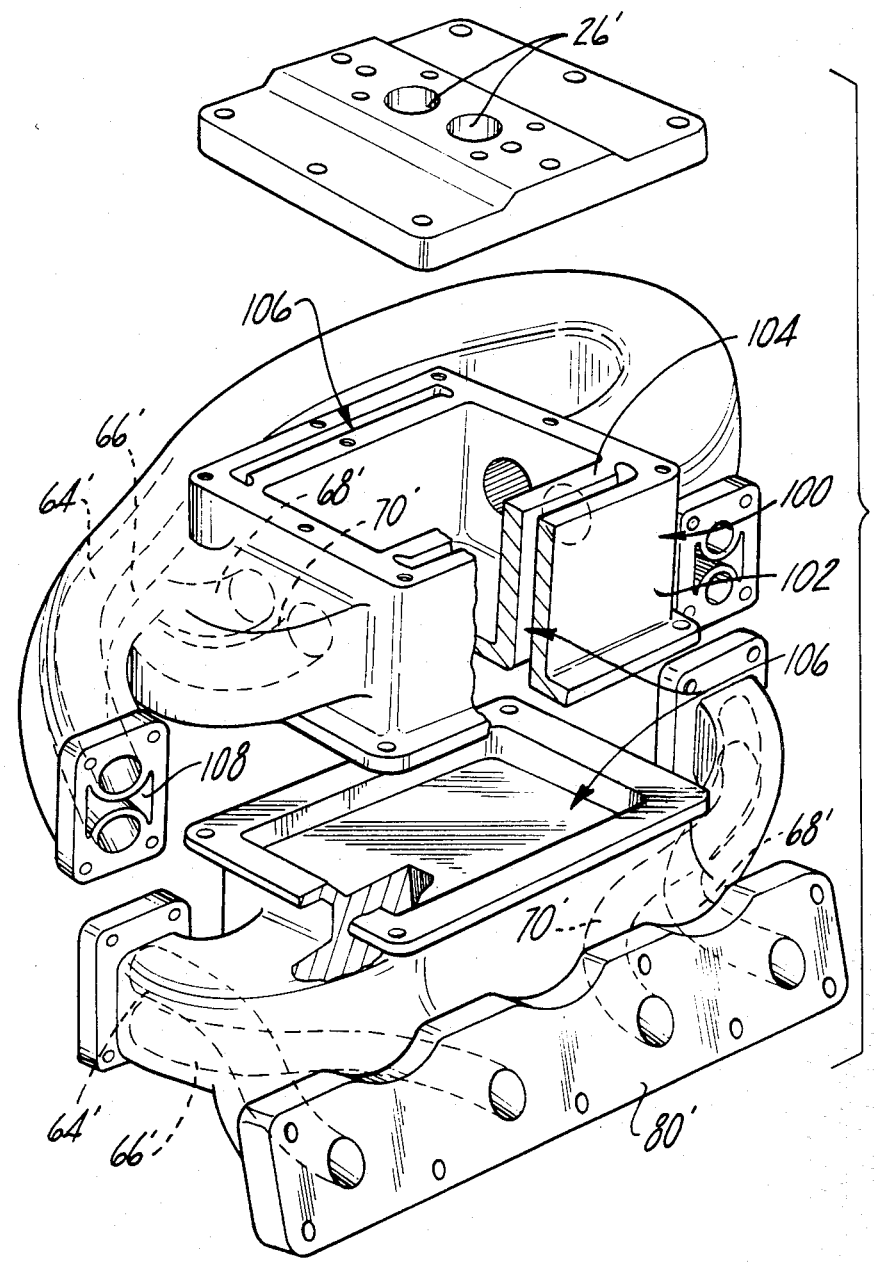

FIGS. 1-6 illustrate a fabricated version of the intake manifold runners and plenum. FIG. 7 illustrates a cast version of the the same tuned intake manifold and plenum. More specifically, FIG. 7 again shows a box-like plenum 100 having an outer housing 102 and an inner subhousing 104 cast as a unit. A heating chamber 106 located on the bottom and at two opposite sides of the plenum again is provided in a manner similar to that shown in FIG. 1. A supply of engine exhaust gases or hot liquid from the engine cooling system would be supplied to the heating chamber to warm the fuel entering the cover bores 26' from the carburetor riser bores. FIG. 7 shows the plenum and manifold in an exploded view to better illustrate the bottom as well as the side wall portions of heating chamber 106.

The four tuned intake manifold runners 64', 66', 68', 70' in this case again are all of the same extended length and are all cast integral to extend from their respective sides of plenum 100 toward the mounting flange 80'. In this case a heating chamber 108 can be cast in the space between the runners to heat the fuel as it passes along the runner length. The runners in this case again are coiled gradually and unidirectionally approximately 270° from the plenum outlets in essentially the same manner as that shown in the fabricated version of FIG. 1. The runners pass beneath and across or around the opposite portion of the plenum in essentially a horizontal plane for connection to the mounting flange. They also cross one another and are nested in a manner similar to the runners of the fabricated version of FIG. 1.

The operation of the invention is believed to be clear from the above description and the consideration of the drawings, and, therefore, will not be given in detail. Suffice it to say that vacuum at the engine intake ports will in this case cause an induction of an air/fuel mixture from the carburetor through throttle riser bores 28 into the heated plenum 20 of FIG. 5 from which it flows at right angles into and through each of the four equal length runners 64, 66, 68 and 70 to the respective inlet ports in predetermined succession. Because of the large radii coils and the gradual tapering of the runners as they approach the inlet ports, the fuel flows with a minimum of wall wetting and condensation. As a result, fuel flows to each of the engine cylinders in essentially equal volumes through the runners. While the runners each are in this case over two and one-half feet long, the coiling and nesting of the runners with respect to each other in a horizontal plane enables an assembly to be made that fits essentially within the lateral confines and beneath the air cleaner assembly, in a space essentially the same as a conventional short runner intake manifold.

From the foregoing, it will be seen that the invention provides a compact intake manifold construction with tuned runners that not only increases the volumetric efficiency and output of the engine over conventional short runners, but occupies essentially no more space than the conventional untuned runner manifold. This is accomplished by coiling the extended length runners in a horizontal plane around an inlet plenum and crossing the runners over one another and nesting them in a manner to fit the assembly essentially within the same space as is normally occupied by a conventional short runner intake manifold, thus enabling its use within present-day low hood line vehicles.

While the invention has been shown and described in its preferred embodiments, it will be clear to those skilled in the arts to which it pertains that many changes and modifications may be made thereto without departing from the scope of the invention. For example, the unit is shown for use with a four cylinder engine using a carbureted air/fuel mixture charge. It would be equally applicable to two, six, or other multiple cylinder engines, and those with a central fuel injection, or direct fuel injection assembly, in which air only would be directed into plenum 20.

I claim:
1. A compact tuned intake manifold for a multi-cylinder automotive type internal combustion engine having a cylinder head comprising,
   a plenum adapted to receive therein an air/fuel mixture charge for flow distribution to the engine cylinder head through separated manifold runners connected to the plenum, the plenum having diametrically opposite sides therein on opposite sides of the centerline of the plenum,
   at least one tubular runner extending directly from each of outlets in the diametrically opposite sides of the plenum to intake ports in the engine cylinder head without interconnection of the flow of the charge between the runner,
   the runners each being extended in length a distance sufficient to tune the runner and being coiled unidirectionally in essentially a horizontal plane for approximately 270° from its respective outlet past the plenum centerline and beneath a diametrically opposite side of the plenum to a respective intake manifold port to provide a compact tuned manifold, with the runners extending from the diametrically opposite outlets crossing one another.
2. A manifold as in claim 1, the runners from opposite sides crossing one another in a nesting manner as they extend to opposite sides.
3. A manifold as in claim 1, the runners curving gradually along their length without abrupt changes in direction and radius of curvature to avoid discontinuity of flow.
4. A manifold as in claim 1, the runners tapering along a portion of their length connected to the cylinder head intake ports to increase the flow velocity of the charge therein to provide a ram effect of the charge.
5. A manifold as in claim 1, wherein the runners are gradually coiled with large bend radii to avoid condensation of fuel by centrifugal force on an interior wall of the runner as the fuel moves along the runner to the engine.
6. A manifold as in claim 1, wherein all of the runners are of the same length.
7. A manifold as in claim 1, including engine exhaust gas directing means to heat the runners.
8. A manifold as in claim 1, the runners having an effective tuned operating range within a minimum spread engine speed range of 1400 to 3600 rpm.
9. A manifold as in claim 1, wherein the runners include a pair of runners extending from each of the diametrically opposite sides of the plenum, the runners being arranged side-by-side both at the plenum outlets and at the cylinder head intake ports with one runner of the pair overlying the other as they coil together around the plenum and at least one runner of each of the pairs passing both diametrically opposite sides of the plenum.
10. A manifold as in claim 1, wherein each pair of runners cross each other in a nesting manner as they extend from the one side of the plenum around past the opposite side.
11. A manifold as in claim 10, the runners each being tightly curled continuously in one direction to provide a compact nested assembly confined essentially within and beneath an enclosure defined by a laterally extending engine conventional air cleaner and silencer assembly.

* * * * *